| United States Patent [19] | [11] | 4,169,928 |
|---|---|---|
| Sidi | [45] | Oct. 2, 1979 |

[54] ALKANOLAMINE SALTS OF DIHYDROXYSTEARIC ACID AS EMULSIFIER IN THE POLYMERIZATION OF VINYL CHLORIDE

[75] Inventor: Henri Sidi, Paramus, N.J.

[73] Assignee: Tenneco Chemicals, Inc., Saddle Brook, N.J.

[21] Appl. No.: 930,479

[22] Filed: Aug. 2, 1978

[51] Int. Cl.² ............................ C08F 2/24; C08F 14/06
[52] U.S. Cl. ..................................... 526/211; 526/204; 526/344.2; 526/345
[58] Field of Search ............ 526/204, 211, 215, 344.2, 526/345

[56] References Cited

U.S. PATENT DOCUMENTS

| 2,934,529 | 4/1960 | Van Dijk et al. ............... 526/344.2 |
| 3,068,184 | 12/1962 | Noorduyn et al. ............. 526/344.2 |
| 3,624,051 | 11/1971 | Bauer et al. .................... 526/344.2 |
| 3,632,562 | 1/1972 | Beier et al. ..................... 526/344.2 |
| 3,709,804 | 1/1973 | Lukhovitsky et al. .......... 526/344.2 |
| 3,876,597 | 4/1975 | Sturt ............................... 526/344.2 |

*Primary Examiner*—Harry Wong, Jr.
*Attorney, Agent, or Firm*—Evelyn Berlow

[57] ABSTRACT

Vinyl chloride polymers are prepared by polymerizing a monomer component that comprises vinyl chloride in an aqueous system in the presence of an emulsifying agent that comprises an alkamine salt of dihydroxystearic acid, for example, triethanolamine dihydroxystearate.

8 Claims, No Drawings

ALKANOLAMINE SALTS OF DIHYDROXYSTEARIC ACID AS EMULSIFIER IN THE POLYMERIZATION OF VINYL CHLORIDE

This invention relates to a process for the production of vinyl chloride resins. More particularly, it relates to an improved process for the polymerization or copolymerization of vinyl chloride in aqueous systems.

Vinyl chloride resins are commonly prepared by emulsion, suspension, and dispersion polymerization techniques in which vinyl chloride or a mixture of vinyl chloride and a comonomer is polymerized in an aqueous system in the presence of a polymerization initiator and an emulsifying agent.

The properties of the resulting aqueous dispersions of the polymers and of the polymers themselves are dependent to a large extent upon the nature of the emulsifying agent used in the polymerization and the amount of the emulsifying agent that is used. For example, when the emulsifying agent is an ammonium or alkali metal salt of certain organic acids, the vinyl chloride polymers obtained have combinations of physical properties that make them particularly suitable for use in the production of plastisols.

Enk et al. disclosed in U.S. Pat. No. 2,981,722 a dispersion polymerization process in which vinyl chloride was polymerized in an aqueous system in the presence of a polymerization initiator, such as lauroyl peroxide, and an emulsifying agent that was an ammonium or alkali metal salt of fatty acids, such as lauric acid or palmitic acid; modified fatty acids, such as epoxystearic acid, dihydroxystearic acid or hydroxyacetoxystearic acid; or dialkylsulfosuccinic acids. Other processes in which the emulsifying agent was an ammonium salt of a carboxylic acid and/or a sulfonic acid were disclosed by Noorduyn et al. in U.S. Pat. No. 3,068,184; by Benetta et al. in U.S. Pat. No. 3,332,918; and by Mathieu in U.S. Pat. No. 3,895,000.

An emulsifying agent that is widely used in the production of vinyl chloride polymers by emulsion, suspension, and dispersion polymerization techniques is ammonium dihydroxystearate. This salt is the product of the reaction of ammonium hydroxide with dihydroxystearic acid. Dihydroxystearic acid is an ester acid that is generally prepared by the processes disclosed in U.S. Pat. Nos. 2,981,722 and 3,031,480, which involve the reaction of oleic acid with hydrogen peroxide in the presence of a catalyst that is a mixture of acetic acid and sulfuric acid. Dihydroxystearic acid prepared in this way usually contains unsaturated compounds and other reaction by-products that have an adverse effect on the free radical polymerization reaction. Thus, it has been found that when the ammonium dihydroxystearate that is used as the emulsifying agent in the production of vinyl chloride polymers has an iodine number of less than 1 and preferably less than 0.1 good yields of vinyl chloride polymers are obtained in a relatively short time, whereas when the ammonium dihydroxystearate has a higher iodine number lower conversions of vinyl chloride to polymer result and longer reaction times are required. Because the conversion of vinyl chloride to polymers is dependent to a large extent upon its purity and because the treatment of ammonium dihydroxystearate to remove unsaturated compounds and other impurities from it is costly and time-consuming, ammonium dihydroxystearate is not entirely satisfactory as the emulsifying agent in processes for the production of vinyl chloride polymers.

It has now been found that certain alkamine salts of dihydroxystearic acid are excellent emulsifying agents for the polymerization of vinyl chloride that have none of the disadvantages of ammonium dihydroxystearate. The use of these salts as the emulsifying agent in the polymerization of vinyl chloride in aqueous systems results in yields of polymer that are appreciably higher than those obtained using the corresponding ammonium salt as the emulsifier even when much less of the alkamine salt is used. In addition, the presence of unsaturated compounds and other impurities in the dihydroxystearic acid from which the alkamine salts are prepared has little or no effect on the yield of polymer or the time required for the polymerization reaction. The products are useful as plastisol or organosol resins.

The emulsifying agents that are used in the process of this invention are alkamine salts of dihydroxystearic acid in which the alkamine is either an alkanolamine having 2 to 10 carbon atoms, morpholine, an N-alkylmorpholine in which the alkyl group has 1 to 3 carbon atoms, or a mixture thereof. Examples of these alkamines include monoethanolamine, diethanolamine, triethanolamine, 1,3-monopropanolamine, 1,3-dipropanolamine, 1,3-tripropanolamine, monoisopropanolamine, diisopropanolamine, triisopropanolamine, trimethylolaminomethane, 2-amino-1-butanol, 2-amino-2-methyl-1,3-propanediol, 2-amino-2-ethyl-1,3-propanediol, morpholine, N-methylmorpholine, N-ethylmorpholine, and N-propylmorpholine. Because of the availability and relatively low cost of the ethanolamines, the ethanolamine salts are the preferred emulsifying agents.

The alkamine salts of dihydroxystearic acid are readily prepared by dissolving dihydroxystearic acid, which has been prepared, for example, by the process disclosed in U.S. Pat. No. 3,031,480 and which preferably has an iodine number of less than 10, in an aqueous solution of the alkamine with heat and agitation provided when necessary to assist in dissolution of the acid. The resulting aqueous solution of the alkamine salt may be used without purification or other treatment as the emulsifying agent in the process of this invention, or the concentration of the alkamine salt in it may be adjusted to any desired level by the addition of water to it or the removal of water from it. Alternatively, alkamine salt that has been separated from the aqueous solution may be used as the emulsifying agent. It is generally preferred that the emulsifying agent be an aqueous solution containing from 10% to 60% by weight of an alkamine salt of dihydroxystearic acid, with particularly good results being obtained when the emulsifying agent is an aqueous solution containing from 20% to 40% by weight of an alkamine salt.

The amount of the emulsifying agent that is used is that which is sufficient to maintain a stable emulsion during the polymerization reaction. While the amount used is dependent to some extent upon the choice of emulsifying agent, polymerization initiator, and reaction conditions, it is usually in the range of from 0.10% to 3.0% by weight, preferably 0.30% to 1.5% by weight, based on the weight of the monomer component in the reaction mixture.

The emulsifying agents of this invention may, if desired, be modified by the addition of from about 5% to 15% by weight of ammonia. The presence of ammonia in the alkamine salt solution often results in a somewhat higher yield of vinyl chloride polymer, but the polymer may be discolored.

The alkamine salts of dihydroxystearic acid can be used as the emulsifying agent is conventional emulsion, dispersion, or suspension procedures for the production of vinyl chloride polymers. In the emulsion polymerization processes, vinyl chloride polymers are prepared using such water-soluble initiators as hydrogen peroxide, organic peroxides, persulfates and redox systems at a temperature in the range of 40° C. to 80° C. In the suspension and dispersion procedures, the polymerization initiator, which is monomer-soluble, may be an organic peroxide, an alkyl peroxydicarbonate, an alkyl peroxypivalate, an azo compound such as azobisisobutyronitrile, or a mixture thereof.

The process of this invention may be used in the production of vinyl halide homopolymers as well as polymers formed by the copolymerization of a vinyl halide with a water-insoluble ethylenically-unsaturated monomer that is copolymerizable therewith. The vinyl halide is ordinarily and preferably vinyl chloride, but the bromide, fluoride, and iodide can also be used. Suitable comonomers include vinyl acetate, vinyl propionate, vinyl stearate, vinyl benzoate, ethylene, propylene, methyl methacrylate, ethyl acrylate, allyl acrylate, acrylamide, acrylonitrile, methacrylonitrile, vinylidene chloride, vinyl ethers, dialkyl fumarates and maleates, and the like. When one or more of the aforementioned comonomers are used, the monomer component contains at least 70% by weight of the vinyl halide. It is preferred that the monomer component be vinyl chloride or that it contain 80% to 90% by weight of vinyl chloride and 10% to 20% by weight of vinyl acetate.

The invention is further illustrated by the following examples. In these examples, all percentages are percentages by weight.

EXAMPLE 1

A series of polymerizations was carried out at 40° C. for 6 hours using a polymerization mixture that contained 170 grams of distilled water, 50 grams of vinyl chloride, 0.8 gram of potassium persulfate, and either 1.88 grams or 3.76 grams of an emulsifying agent. At the end of the polymerizations, the polymers were isolated and dried in a forced-air oven at 45° C.

The following emulsifying agents were used in the polymerizations:
1. 40% aqueous solution of triethanolamine salt of crude dihydroxystearic acid (iodine number=2.65)
2. 40% aqueous solution of triethanolamine salt of crude dihydroxystearic acid (iodine number=2.65) containing 6% by weight of ammonia
3. 40% aqueous solution of triethanolamine salt of purified dihydroxystearic acid (iodine number=<0.1)
4. 40% aqueous solution of triethanolamine salt of purified dihydroxystearic acid (iodine number=<0.1) containing 7.8% by weight of ammonia.

For comparative purposes, polymerizations of vinyl chloride were carried out using the following emulsifying agents:
A. 40% aqueous solution of ammonium salt of crude dihydroxystearic acid (iodine number=2.96) (Henkel's DHW-80, Lot 2746)
B. 40% aqueous solution of ammonium salt of crude dihydroxystearic acid (iodine number=1.60) (Henkel's DHW-80, Lot 2668).

The results obtained are summarized in Table I.

Table I

| Ex. No. | Emulsifying Agent* | Weight of Emulsifying Agent (g) | Weight of Polymer (g) | Yield of Polymer % | Color of Polymer |
|---|---|---|---|---|---|
| 1-1 | 40% Aqueous Solution of TEA Salt of Crude DHSA | 1.88 | 50.2 | 100.4 | White |
| 1-2 | " | 3.76 | 51.1 | 102.2 | White |
| 1-3 | 40% Aqueous Solution of TEA Salt of Crude DHSA + Ammonia | 1.88 | 50.4 | 100.8 | White |
| 1-4 | " | 3.76 | 50.8 | 101.6 | Off-white |
| 1-5 | 40% Aqueous Solution of TEA Salt of Purified DHSA | 1.88 | 49.4 | 98.8 | White |
| 1-6 | " | 3.76 | 50.9 | 101.8 | White |
| 1-7 | 40% Aqueous Solution of TEA Salt of Purified DHSA + Ammonia | 1.88 | 52.0 | 104.0 | White |
| 1-8 | " | 3.76 | 51.2 | 102.4 | Off-white |
| 1-A | 40% Aqueous Solution of NH4 Salt of Crude DHSA (Iodine No. = 2.96) | 1.88 | 34.9 | 69.8 | White |
| 1-B | 40% Aqueous Solution of NH4 Salt of Crude DHSA (Iodine No. = 1.60) | 1.88 | 27.4 | 54.8 | White |

*TEA = Triethanolamine
DHSA = Dihydroxystearic Acid

From the data in Table I, it will be seen that substantially quantitative yields of polyvinyl chloride were obtained when triethanolamine dihydroxystearate was used as the emulsifying agent, whereas when the emulsifying agent was the corresponding ammonium salt, the yields of polyvinyl chloride were less than 70%.

In some cases, the presence of ammonia in the triethanolamine salt emulsifying agents resulted in higher yields of polymer, but two of the polymers prepared in the presence of the larger amount of the ammonia-containing emulsifying agents were discolored.

EXAMPLE 2

A series of polymerizations was carried out by the procedure described in Example 1, but using various amounts of the triethanolamine salt of crude dihydroxystearic acid (iodine number=2.65) as the emulsifying agent. For comparative purposes, polymerizations were also carried out using the ammonium salt of crude dihydroxystearic acid (iodine number=2.65) as the emulsifying agents. The amounts of the emulsifying agents that were used and the results obtained are set forth in Table II.

Table II

| Ex. No. | Emulsifying Agent | Weight of Emulsifying Agent (40% Solids)(g) | Weight of Polymer (g) | Yield of Polymer (%) |
|---|---|---|---|---|
| 2-1 | TEA Salt of | 0.752 | 50.2 | 100.4 |
| 2-2 | " | 0.376 | 49.0 | 98.0 |
| 2-3 | " | 0.188 | 47.9 | 95.8 |
| 3-4 | " | 0.094 | 35.9 | 71.8 |
| 2-A | NH₄ Salt of Crude DHSA | 0.752 | 31.9 | 63.8 |

The yields of polyvinyl chloride were substantially higher (95.8%–100.4% vs. 63.8%) when the emulsifying agent was triethanolamine dihydroxystearate than when it was the ammonium salt even when only 25% as much of the triethanolamine salt was used. When 12.5% as much of the triethanolamine salt as the ammonium salt was used, the yield was also higher (71.8% vs. 63.8%).

EXAMPLE 3

A series of polymerizations was carried out at 53° C. for 22 hours using a reaction mixture that contained 52 grams of distilled water, 50 grams of vinyl chloride, 0.06 gram of lauroyl peroxide, and various amounts of an emulsifying agent.

The emulsifying agent used was either a 20% aqueous solution of triethanolamine salt of crude dihydroxystearic acid or, for comparative purposes, a 40% aqueous solution of ammonium salt of the same crude dihydroxystearic acid.

The amounts of emulsifying agent used and the results obtained are summarized in Table III.

Table III

| Ex. No. | Emulsifying Agent | Wt. of Emulsifying Agent (g) As Aqueous Solution | As 100% Solids | Wt. of Polymer (g) | Yield of Polymer (%) |
|---|---|---|---|---|---|
| 3-1 | 20% Aqueous Solution of TEA Salt of Crude DHSA | 3.0 | 0.600 | 44.9 | 89.8 |
| 3-2 | " | 1.5 | 0.300 | 45.0 | 90.0 |
| 3-3 | " | 0.75 | 0.150 | 45.0 | 90.0 |
| 3-4 | " | 0.38 | 0.075 | 44.4 | 88.8 |
| 3-A | 40% Aqueous Solution of NH₄ Salt of Crude DHSA | 1.50 | 0.600 | 37.2 | 74.4 |

The data in Table III show that yields of about 90% were obtained when from 0.075 g. to 0.600 g. of the triethanolamine salt was used as the emulsifying agent. These yields are more than 14% higher than that obtained when 0.600 g. of the ammonium salt was used.

EXAMPLE 4

A series of polymerizations was carried out using the procedure described in Example 1, but using various amounts of 20% aqueous solutions of diethanolamine or monoethanolamine salts of crude dihydroxystearic acid (iodine number=3.6) as the emulsifying agent.

The results obtained are summarized in Table IV.

Yields of more than 90% of polymer were obtained when as little as 0.094 gram of diethanolamine salt of dihydroxystearic acid or as little as 0.188 gram of the monoethanolamine salt was used as the emulsifier.

Similar results are obtained when salts of each of the other alkamines disclosed herein are used as the emulsifying agent in the production of vinyl chloride polymers in aqueous systems.

Table IV

| Ex. No. | Emulsifying Agent | Weight of Emulsifying Agent (g) As 20% Solids | As 100% Solids | Wt. of Polymer (g) | Yield of Polymer (%) |
|---|---|---|---|---|---|
| 4-1 | Diethanolamine Salt of Crude DHSA | 3.76 | 0.752 | 49.6 | 99.2 |
| 4-2 | " | 1.88 | 0.376 | 49.7 | 99.4 |
| 4-3 | " | 0.94 | 0.188 | 48.1 | 96.2 |
| 4-4 | " | 0.47 | 0.094 | 46.2 | 92.4 |
| 4-5 | Monoethanolamine Salt of Crude DHSA | 3.76 | 0.752 | 48.6 | 97.2 |
| 4-6 | " | 1.88 | 0.376 | 48.3 | 96.6 |
| 4-7 | " | 0.94 | 0.188 | 47.1 | 94.2 |
| 4-8 | " | 0.47 | 0.094 | 24.4 | 48.8 |
| 4-A | Ammonium Salt of Crude DHSA | 3.76 | 0.752 | 32.9 | 65.8 |
| 4-B | " | 1.88 | 0.376 | 27.4 | 54.8 |

What is claimed is:
1. In the process for the polymerization of a monomer component selected from the group consisting of vinyl chloride and mixtures of vinyl chloride with at least one ethylenically-unsaturated monomer that is copolymerizable therewith, said mixtures containing at least 70% by weight of vinyl chloride, in an aqueous medium at a temperature in the range of 40° C. to 80° C. in the presence of a free radical generating polymerization initiator and an emulsifying agent, the improvement wherein the polymerization is carried out in the presence of from 0.10% to 3.0% by weight, based on the weight of the monomer component, of the emulsifying agent, said emulsifying agent being an alkanolamine salt of dihydroxystearic acid, the alkanolamine being selected alkanolamines having 2 to 10 carbon atoms.
2. The process of claim 1 wherein the emulsifying agent is an ethanolamine salt of dihydroxystearic acid.

3. The process of claim 1 wherein the emulsifying agent is added in the form of a 10% to 60% aqueous solution of said alkanolamine salt.

4. The process of claim 1 wherein the emulsifying agent is added in the form of a 20% to 40% aqueous solution of said alkanolamine salt.

5. The process of claim 1 wherein the polymerization is carried out in the presence of from 0.30% to 1.5% by weight, based on the weight of the monomer component, of the emulsifying agent.

6. The process of claim 1 wherein the emulsifying agent is added in the form of a 10% to 60% aqueous solution of alkanolamine dihydroxystearate that contains from 5% to 15% by weight of ammonia.

7. The process of claim 1 wherein the emulsifying agent is an alkanolamine salt of dihydroxystearic acid that has an iodine number of less than 10.

8. The process of claim 1 wherein the monomer component consists essentially of vinyl chloride.

* * * * *

UNITED STATES PATENT AND TRADEMARK OFFICE
CERTIFICATE OF CORRECTION

PATENT NO. : 4,169,928
DATED : October 2, 1979
INVENTOR(S) : Henri Sidi

It is certified that error appears in the above-identified patent and that said Letters Patent are hereby corrected as shown below:

Column 5, line 10, after "TEA Salt of" insert -- Crude DHSA --.

Column 6, delete lines 51 and 52, and in their place insert -- droxystearic acid wherein the alkanolamine has 2 to 10 carbon atoms.

*Signed and Sealed this*

*Eleventh* Day of *December 1979*

[SEAL]

*Attest:*

*Attesting Officer*

SIDNEY A. DIAMOND

*Commissioner of Patents and Trademarks*